US012440680B2

(12) United States Patent
Voloshin-Sela et al.

(10) Patent No.: US 12,440,680 B2
(45) Date of Patent: Oct. 14, 2025

(54) METHODS OF TREATING DISEASE BY SKEWING MACROPHAGE PHENOTYPE WITH ALTERNATING ELECTRIC FIELDS

(71) Applicant: Novocure GmbH, Root (CH)

(72) Inventors: Tali Voloshin-Sela, Kibbutz Gvat (IL); Lilach Avigdor, Haifa (IL); Boris Brant, Haifa (IL)

(73) Assignee: Novocure GmbH, Baar (CH)

( * ) Notice: Subject to any disclaimer, the term of this patent is extended or adjusted under 35 U.S.C. 154(b) by 37 days.

(21) Appl. No.: 17/692,807

(22) Filed: Mar. 11, 2022

(65) Prior Publication Data

US 2022/0288395 A1 Sep. 15, 2022

Related U.S. Application Data

(60) Provisional application No. 63/160,437, filed on Mar. 12, 2021.

(51) Int. Cl.
*A61N 1/00* (2006.01)
*A61K 45/06* (2006.01)
*A61N 1/36* (2006.01)

(52) U.S. Cl.
CPC .......... *A61N 1/36171* (2013.01); *A61K 45/06* (2013.01); *A61N 1/36007* (2013.01); *A61N 1/3601* (2013.01)

(58) Field of Classification Search
CPC ............ A61N 1/36171; A61N 1/36007; A61N 1/3601; A61K 45/06
See application file for complete search history.

(56) References Cited

U.S. PATENT DOCUMENTS

| | | |
|---|---|---|
| 5,233,987 A | 8/1993 | Fabian et al. |
| 6,868,289 B2 | 3/2005 | Palti |
| 7,016,725 B2 | 3/2006 | Palti |
| 7,089,054 B2 | 8/2006 | Palti |
| 7,136,699 B2 | 11/2006 | Palti |
| 7,333,852 B2 | 2/2008 | Palti |
| 7,467,011 B2 | 12/2008 | Palti |
| 7,519,420 B2 | 4/2009 | Palti |
| 7,565,205 B2 * | 7/2009 | Palti .......................... A61N 1/40 607/76 |
| 7,565,206 B2 | 7/2009 | Palti |
| 7,599,745 B2 | 10/2009 | Palti |
| 7,599,746 B2 | 10/2009 | Palti |
| 7,706,890 B2 | 4/2010 | Palti |
| 7,715,921 B2 | 5/2010 | Palti |
| 7,805,201 B2 | 9/2010 | Palti |
| 7,890,183 B2 | 2/2011 | Palti et al. |
| 7,912,540 B2 | 3/2011 | Palti |
| 7,917,227 B2 | 3/2011 | Palti |
| 8,019,414 B2 | 9/2011 | Palti |
| 8,027,738 B2 | 9/2011 | Palti |
| 8,170,684 B2 | 5/2012 | Palti |
| 8,175,698 B2 | 5/2012 | Palti et al. |
| 8,229,555 B2 | 7/2012 | Palti |
| RE43,618 E | 8/2012 | Palti |
| 8,244,345 B2 | 8/2012 | Palti |
| 8,406,870 B2 | 3/2013 | Palti |
| 8,447,395 B2 | 5/2013 | Palti et al. |
| 8,447,396 B2 | 5/2013 | Palti et al. |
| 8,465,533 B2 | 6/2013 | Palti |
| 8,706,261 B2 | 4/2014 | Palti |
| 8,715,203 B2 | 5/2014 | Palti |
| 8,718,756 B2 | 5/2014 | Palti |
| 8,764,675 B2 | 7/2014 | Palti |
| 9,023,090 B2 | 5/2015 | Palti |
| 9,023,091 B2 | 5/2015 | Palti |
| 9,039,674 B2 | 5/2015 | Palti et al. |
| 9,056,203 B2 | 6/2015 | Palti et al. |
| 9,440,068 B2 | 9/2016 | Palti et al. |
| 9,655,669 B2 | 5/2017 | Palti et al. |
| 9,750,934 B2 * | 9/2017 | Palti .......................... A61N 1/30 |
| 9,910,453 B2 | 3/2018 | Wasserman et al. |
| 10,188,851 B2 | 1/2019 | Wenger et al. |
| 10,441,776 B2 | 10/2019 | Kirson et al. |
| 11,191,956 B2 | 12/2021 | Giladi et al. |
| 2006/0167499 A1 | 7/2006 | Palti |
| 2007/0225766 A1 | 9/2007 | Palti |
| 2007/0239213 A1 | 10/2007 | Palti |
| 2009/0076366 A1 | 3/2009 | Palti |
| 2009/0182394 A1 | 7/2009 | Bachinski |

(Continued)

FOREIGN PATENT DOCUMENTS

| | | |
|---|---|---|
| WO | 02068049 A1 | 9/2002 |
| WO | 2016172595 A1 | 10/2016 |
| WO | 2021137094 A1 | 7/2021 |

OTHER PUBLICATIONS

Lowrie et al., Division and Death Rates of *Salmonella typhimurium* Inside Macrophages: Use of Penicillin as a Probe, Journal of General Microbiology, 110, 409-419. (Year: 1979).*
Keles et al., Inactivation of *Salmonella* spp. by Low-Frequency Electric Fields in Sewage Sludge, International Journal of Civil & Environmental Engineering IJCEE-IJENS vol. 10 No. 06 (Year: 2010).*
Giladi in "Microbial Growth Inhibition by Alternating Electric Fields in Mice with Pseudomonas aeruginosa Lung Infection", Antimicrobial Agents and Chemotherapy, pp. 3212-3218, published Aug. 1, 2010). (Year: 2010).*
Edin et al., "The distribution of macrophages with a M1 or M2 phenotype in relation to prognosis and the molecular characteristics of colorectal cancer," PLoS One, vol. 7, No. 10, p. e47045, Oct. 2012.
Feng et al., "Wnt/β-Catenin-Promoted Macrophage Alternative Activation Contributes to Kidney Fibrosis," Journal of the American Society of Nephrology, vol. 29, No. 1, pp. 182-193, Jan. 2018.

(Continued)

*Primary Examiner* — Catherine S Hibbert
(74) *Attorney, Agent, or Firm* — Potomac Law Group, PLLC

(57) ABSTRACT

Methods of treating diseases and infections by applying alternating electric fields to tissues followed by administering a treatment for the disease or infection are provided. In some instances, alternating electric fields can be applied at least until substantial improvement in disease manifestation. The exemplary methods can be used to treat kidney, heart, brain, and bone disease and conditions.

5 Claims, 16 Drawing Sheets

(56) References Cited

U.S. PATENT DOCUMENTS

| | | | |
|---|---|---|---|
| 2012/0283726 A1 | 11/2012 | Palti | |
| 2012/0290048 A1* | 11/2012 | Marc | A61N 1/403 607/98 |
| 2014/0330268 A1 | 11/2014 | Palti et al. | |
| 2016/0074480 A1* | 3/2016 | Shantha | A61K 31/366 514/2.4 |
| 2017/0120041 A1 | 5/2017 | Wenger et al. | |
| 2017/0215939 A1 | 8/2017 | Palti et al. | |
| 2017/0266283 A1* | 9/2017 | Soikum | A61N 1/327 |
| 2017/0281934 A1 | 10/2017 | Giladi et al. | |
| 2018/0001075 A1 | 1/2018 | Kirson et al. | |
| 2018/0008708 A1 | 1/2018 | Giladi et al. | |
| 2018/0050200 A1 | 2/2018 | Wasserman et al. | |
| 2018/0160933 A1 | 6/2018 | Urman et al. | |
| 2018/0202991 A1 | 7/2018 | Giladi et al. | |
| 2019/0117956 A1 | 4/2019 | Wenger et al. | |
| 2019/0117963 A1 | 4/2019 | Travers et al. | |
| 2019/0307781 A1 | 10/2019 | Krex et al. | |
| 2019/0308016 A1 | 10/2019 | Wenger et al. | |
| 2020/0001069 A1 | 1/2020 | Kirson et al. | |
| 2020/0009376 A1 | 1/2020 | Chang et al. | |
| 2020/0009377 A1 | 1/2020 | Chang et al. | |
| 2020/0016067 A1 | 1/2020 | Gotlib et al. | |
| 2020/0023179 A1 | 1/2020 | Bomzon et al. | |
| 2020/0061360 A1 | 2/2020 | Hagemann et al. | |
| 2020/0061361 A1 | 2/2020 | Hagemann et al. | |
| 2020/0069937 A1 | 3/2020 | Naveh et al. | |
| 2020/0078582 A1 | 3/2020 | Alon et al. | |
| 2020/0108031 A1 | 4/2020 | Borst et al. | |
| 2020/0114141 A1 | 4/2020 | Bomzon et al. | |
| 2020/0121728 A1 | 4/2020 | Wardak et al. | |
| 2020/0129761 A1 | 4/2020 | Bomzon et al. | |
| 2020/0146586 A1 | 5/2020 | Naveh et al. | |
| 2020/0155835 A1 | 5/2020 | Wasserman et al. | |
| 2020/0171297 A1 | 6/2020 | Kirson et al. | |
| 2020/0179512 A1 | 6/2020 | Giladi et al. | |
| 2020/0219261 A1 | 7/2020 | Shamir et al. | |
| 2020/0269041 A1 | 8/2020 | Zeevi et al. | |
| 2020/0368525 A1 | 11/2020 | Maag et al. | |
| 2021/0031031 A1 | 2/2021 | Wasserman et al. | |
| 2021/0038584 A1 | 2/2021 | Voloshin-Sela | |
| 2021/0060334 A1 | 3/2021 | Avraham et al. | |
| 2021/0069503 A1 | 3/2021 | Tran et al. | |
| 2021/0187277 A1 | 6/2021 | Wasserman et al. | |
| 2021/0196348 A1 | 7/2021 | Wasserman | |
| 2021/0199640 A1 | 7/2021 | Patel et al. | |
| 2021/0203250 A1 | 7/2021 | Wasserman | |
| 2021/0268247 A1 | 9/2021 | Story et al. | |
| 2021/0299440 A1 | 9/2021 | Deslauriers et al. | |
| 2021/0308446 A1 | 10/2021 | Alon et al. | |
| 2021/0330950 A1* | 10/2021 | Hagemann | A61N 1/327 |
| 2021/0346694 A1 | 11/2021 | Wasserman et al. | |
| 2021/0379362 A1 | 12/2021 | Smith et al. | |
| 2021/0408383 A1 | 12/2021 | Kalra et al. | |
| 2022/0095997 A1 | 3/2022 | Wasserman | |
| 2022/0096821 A1 | 3/2022 | Kirson et al. | |
| 2022/0118249 A1 | 4/2022 | Bomzon et al. | |
| 2022/0161028 A1 | 5/2022 | Giladi et al. | |
| 2022/0184392 A1 | 6/2022 | Wasserman et al. | |
| 2023/0009366 A1* | 1/2023 | Voloshin-Sela | A61N 1/40 |

OTHER PUBLICATIONS

Giladi et al., "Mitotic Spindle Disruption by Alternating Electric Fields Leads to Improper Chromosome Segregation and Mitotic Catastrophe in Cancer Cells," Scientific Reports, vol. 5, p. 18046, Dec. 2015.

Gombozhapova et al., "Macrophage activation and polarization in post-infarction cardiac remodeling," Journal of Biomedical Science, vol. 24, No. 1, p. 13, Feb. 2017.

Hirayama et al., "The Phagocytic Function of Macrophage-Enforcing Innate Immunity and Tissue Homeostasis," International Journal of Molecular Sciences, vol. 19, No. 1, p. 92, Dec. 2017.

International Search Report and Written Opinion issued in application PCT/IB2022/05226 dated Jun. 14, 2022.

Mills et al., "Macrophages at the fork in the road to health or disease," Frontiers in Immunology, vol. 6, Article 59, Feb. 2015.

Wang et al., "Molecular mechanisms that influence the macrophage M1-M2 polarization balance," Frontiers in Immunology, vol. 5, Article 614, Nov. 2014.

Wong et al., "Tumor treating fields exert cellular and immunologic effects," Proceedings of the 109th Annual Meeting of the American Association for Cancer Research, Apr. 14-18, 2018, Chicago, Illinois, Abstract nr1707.

Yunna et al., "Macrophage M1/M2 polarization," European Journal of Pharmacology, vol. 877, p. 173090, Jun. 2020.

Giladi et al., "Microbial Growth Inhibition by Alternating Electric Fields," Antimicrobial Agents and Chemotherapy, vol. 52, No. 10, pp. 3517-3522, Oct. 2008.

Unknown, "T.R. Shantha, M.D., Prosecuted for Fraud," www.quackwatch.org/cases/doj/shantha/indictment, Feb. 2008.

* cited by examiner

METHODS OF TREATING DISEASE BY SKEWING MACROPHAGE PHENOTYPE WITH ALTERNATING ELECTRIC FIELDS

CROSS REFERENCE TO RELATED APPLICATIONS

This Application claims the benefit of U.S. Provisional Application 63/160,437, filed Mar. 12, 2022, which is incorporated herein by reference in its entirety.

BACKGROUND

Tumor Treating Fields (TTFields) are an effective antineoplastic treatment that involves applying low intensity, intermediate frequency (e.g., 100-500 kHz), alternating electric fields to a target region.

In the in vivo context, TTFields therapy can be delivered using a wearable and portable device (Optune®). The delivery system includes an electric field generator, four adhesive patches (non-invasive, insulated transducer arrays), rechargeable batteries and a carrying case. The transducer arrays are applied to the skin and are connected to the device and battery. The therapy is designed to be worn for as many hours as possible throughout the day and night. In the preclinical setting, TTFields can be applied in vitro using, for example, the Inovitro™ TTFields lab bench system. Inovitro™ includes a TTFields generator and base plate containing 8 ceramic dishes per plate. Cells are plated on cover slips placed inside each dish. TTFields are applied using two perpendicular pairs of transducer arrays insulated by a high dielectric constant ceramic in each dish. In both the in vivo and in vitro contexts, the orientation of the TTFields is switched 90° every 1 second, thus covering different orientation axes of cell divisions.

Macrophages play an important role in many pathologies and can trigger various immune responses. Hirayama et al., *The Phagocytic function of Macrophage-enforcing innate immunity and tissue homeostasis*, Int J Mol Sci. 2018 Jan.; 19(1): 92. Mills et al., *Macrophages at the fork in the road for disease or health* Front Immunol. 2015; 6: 59. Macrophages secrete various cytokines that can promote or inhibit inflammatory responses, depending on the context. Wang et al. *Molecular mechanisms that influence the macrophage m1-m2 polarization balance*, Front Immunol. 2014 5:614. In addition, macrophages play a major role in wound healing and fibrosis. Gombozhapova et al., *Macrophage activation and polarization in post-infraction remodelling*, Journal of biomedical science (2017) 24:13, Feng et al., *Wnt/6-Catenin promoted macrophage alternative activation contributes to kidney fibrosis*, J Am Soc Nephrol, 2018 29(1):182-193.

Macrophages can differentiate into activated macrophages in 2 classes: M1 (M1-classically activated macrophages) and M2 (M2-alternatively activated macrophages). Yunna, et al., *Macrophage M1/M2 polarization*, Eur J Pharmacol 2020 Jun. 15;877. M1 macrophages are typically associated with pro-inflammatory responses. M2 macrophages are associated with wound healing and are usually secrete anti-inflammatory cytokines.

SUMMARY

As described herein, the macrophage phenotype within a target region (e.g., tissue and a living subject or cells plated on a cover slip) can be skewed by applying alternating electric fields to cells in the target region. In some instances, macrophage phenotype can be skewed from an M0 or M2 phenotype toward the M1 phenotype by applying alternating electric fields to a target tissue, location, or cell type of a subject in need of treatment for a disease or condition prior to or during treatment of the subject for a disease or condition with a drug or other treatment.

As described herein, skewing or shifting the phenotype of a subject's macrophages from an M0 (naive) or M2 (non-classically activated) to an M1 phenotype (classically activated) induces a "pro-inflammatory" immune response that results in a subject with certain pathologies being more susceptible to treatment. Thus, "pushing" the macrophage sub-type toward an M1 phenotype prior to treatment of a disease or condition (e.g., bacterial infection, endocarditis) with alternating electric fields can increase the effectiveness of a treatment or require a lower dose of a treatment and avoid unnecessary side effects.

In one aspect, a first method is provided comprising treating an infection with *Tropheryma whipplei, Salmonella*, or *Mycobacterium* in a digestive system of a subject by applying alternating electric fields to the digestive system of the subject at a frequency between 50 and 1000 kHz (e.g., 100 and 500 kHz) and administering a therapeutically effective amount of a drug for treating an infection with *Tropheryma whipplei, Salmonella*, or *Mycobacterium* to the subject.

In another aspect, a second method is provided comprising treating an infection with *Mycobacterium* in a lung of a subject by applying alternating electric fields to the lung of the subject at a frequency between 50 and 1000 kHz (e.g., 100 and 500 kHz) and administering a therapeutically effective amount of a drug for treating an infection with *Mycobacterium* to the subject.

In a further aspect, a third method is provided comprising treating an infection with *Mycobacterium bovis* bacillus in a brain of a subject by applying alternating electric fields to the brain of the subject at a frequency between 50 and 1000 kHz (e.g., 100 and 500 kHz) and administering a therapeutically effective amount of a drug for treating an infection with *Mycobacterium* to the subject.

In yet another aspect, a fourth method is provided comprising treating an infection with *Mycobacterium bovis* bacillus in a bone or a joint of a subject by applying alternating electric fields to the bone or joint of the subject at a frequency between 50 and 1000 kHz (e.g., 100 and 500 kHz) and administering a therapeutically effective amount of a drug for treating an infection with *Mycobacterium bovis* bacillus to the subject.

In another aspect, a fifth method is provided comprising treating an infection with *Mycobacterium bovis* bacillus in a heart of a subject by applying alternating electric fields to the heart of the subject at a frequency between 50 and 1000 kHz (e.g., 100 and 500 kHz) and administering a therapeutically effective amount of a drug for treating an infection with *Mycobacterium bovis* bacillus to the subject.

In a further aspect, a sixth method is provided comprising treating endocarditis caused by an infection with *Mycobacterium bovis* bacillus in an inner lining of a heart of a subject by applying alternating electric fields to the heart of the subject at a frequency between 50 and 1000 kHz (e.g., 100 and 500 kHz) and administering a therapeutically effective amount of a drug for treating an infection with *Mycobacterium bovis* bacillus to the subject.

DETAILED DESCRIPTION

Figure 1A:
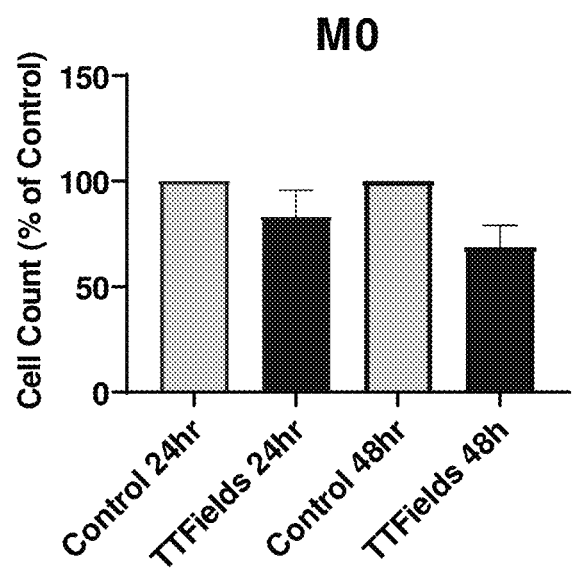
FIG. 1A provides an exemplary analysis of cytotoxicity (cell count as percent of control) control M0 macrophages and TTFields-treated (24 and 48 hours) M0 macrophages.

All references cited herein, including but not limited to patents and patent applications, are incorporated herein by reference in their entirety.

Alternating electric fields can be applied to regions of a subject's body to stimulate the immune system by, for example, shifting or skewing the phenotype of macrophages towards a "proinflammatory" M1 phenotype. Skewing macrophage phenotype toward an M1 phenotype can make a subject more susceptible to treatment for a disease or condition, such as an infection, because the subject's immune system has been stimulated. As described herein, alternating electric fields can be applied to a region of the body prior to or during treatment for a disease or condition.

The alternating electric fields discussed herein are similar to tumor treating fields (TTFields) and may be applied using hardware that is similar to Novocure's Optune® device, either at the same 200 kHz frequency that Optune uses, or at a different frequency (e.g., 50 to 1000 kHz or 100 to 500 kHz). The size and shape of the transducer arrays that are used to apply the alternating electric fields to the subject's body will vary depending on the anatomical location to which the alternating electric fields are applied. The term "TTFields" as used herein and in the Figures is synonymous with the term "alternating electric fields."

In one aspect, a first method is provided comprising treating an infection with *Tropheryma whipplei*, *Salmonella*, or *Mycobacterium* in a digestive system of a subject by applying alternating electric fields to the digestive system of the subject at a frequency between 50 and 1000 kHz (e.g., 100 and 500 kHz) and administering a therapeutically effective amount of a drug for treating an infection with *Tropheryma whipplei*, *Salmonella*, or *Mycobacterium* to the subject.

In some instances of the first method, the antibiotic is selected from the group consisting of one or more of penicillin, streptomycin, tetracycline, ceftriaxone, meropenem, co-trimoxazole, doxycycline, hydroxychloroquine, fluoroquinolones, and azithromycin.

In some instances of the first method, the alternating electric fields are applied for at least 24 hours or at least 48 hours. In some instances of the first method, the frequency is between 125 to 175 kHz. In some instances of the first method, the alternating electric fields are applied until the digestive system of the subject is not infected with *Mycobacterium*. Alternating electric fields can be applied prior to, during, or after standard of care or other treatment for the disease or condition.

The term "therapeutically effective amount," as used herein, refers to an amount of a drug or dose of drug sufficient to achieve its intended purpose to ameliorate, prevent, treat, or cure the disease or condition indicated. A therapeutically effective amount of a drug can be determined, for example, by one of ordinary skill in the art, from a drug or product label or from results of experiments or clinical trials designed to determine the therapeutically effective dose, pharmacokinetic, or other properties of a drug.

For example, a person of ordinary skill in the art can determine a therapeutically effective dose for azathioprine by consulting the drug label for azathioprine, as approved by the U.S. Food and Drug Administration (FDA), available at www.accessdata.fda.gov/drugsatfda_docs/label/2011/016324s034s035lbl.pdf. A person of ordinary skill in the art can consult a product label approved by the FDA or other regulatory authority for any approved drug or treatment referenced herein. The term "treating," as used herein, refers to prescribing, administering, or directing others to administer a drug or treatment to a subject.

Skewing or shifting of macrophage phenotype can be determined, for example, by determining the ratio of M1 macrophage to M2 macrophage phenotype using a suitable method (e.g., flow cytometry, immunohistochemistry staining of biopsies) as disclosed herein, or by other suitable methods (see, e.g., Edin S, *The Distribution of Macrophages with a M1 or M2 Phenotype in Relation to Prognosis and the Molecular Characteristics of Colorectal Cancer*. PLoS ONE 7(10)(2012); Sica et al., *Macrophage polarization in pathology*, Cell. Mol. Life Sci, 2015.

In another aspect, a second method is provided comprising treating an infection with *Mycobacterium* in a lung of a subject by applying alternating electric fields to the lung of the subject at a frequency between 50 and 1000 kHz (e.g., 100 and 500 kHz) and administering a therapeutically effective amount of a drug for treating an infection with *Mycobacterium* to the subject.

In some instances of the second method, the antibiotic is selected from the group consisting of one or more of clarithromycin, azithromycin, rifampin, rifabutin, ethambutol, streptomycin, and amikacin.

In some instances of the second method, the alternating electric fields are applied for at least 24 hours or at least 48 hours. In some instances of the second method, the frequency is between 125 to 175 kHz. In some instances of the second method, the alternating electric fields are applied until the lung of the subject is not infected with *Mycobacterium*. Alternating electric fields can be applied prior to, during, or after standard of care or other treatment for the disease or condition.

In a further aspect, a third method is provided comprising treating an infection with *Mycobacterium bovis* bacillus in a brain of a subject by applying alternating electric fields to the brain of the subject at a frequency between 50 and 1000 kHz (e.g., 100 and 500 kHz) and administering a therapeutically effective amount of a drug for treating an infection with *Mycobacterium bovis* bacillus to the subject.

In some instances of the third method, the antibiotic is selected from the group consisting of one or more of isoniazid, rifampicin, ethambutol, moxifloxacin, pyrazinamide, and streptomycin.

In some instances, the third method, further comprises administering a therapeutically effective amount of a steroid to the subject. The steroid can be selected from the group consisting of one or more of prednisone and dexamethasone.

In some instances of the third method, the alternating electric fields are applied for at least 24 hours or at least 48 hours. In some instances of the third method, the frequency is between 125 to 175 kHz. In some instances of the third method, the alternating electric fields are applied until the brain of the subject is not infected with *Mycobacterium bovis* bacillus. Alternating electric fields can be applied prior to, during, or after standard of care or other treatment for the disease or condition.

In yet another aspect, a fourth method is provided comprising treating an infection with *Mycobacterium bovis* bacillus in a bone or a joint of a subject by applying alternating electric fields to the bone or joint of the subject at a frequency between 50 and 1000 kHz (e.g., 100 and 500 kHz) and administering a therapeutically effective amount of a drug for treating an infection with *Mycobacterium bovis* bacillus to the subject.

In some instances of the fourth method, the antibiotic is selected from the group consisting of one or more of isoniazid, rifampicin, ethambutol, moxifloxacin, pyrazinamide, and streptomycin.

In some instances, the fourth method further comprises administering a therapeutically effective amount of a steroid to the subject. The steroid can be selected from the group consisting of one or more of prednisone and dexamethasone.

In some instances of the fourth method, the alternating electric fields are applied for at least 24 hours or at least 48 hours. In some instances of the fourth method, the frequency is between 125 to 175 kHz. In some instances of the fourth method, the alternating electric fields are applied until the bone or joint of the subject is not infected with *Mycobacterium bovis* bacillus. Alternating electric fields can be applied prior to, during, or after standard of care or other treatment for the disease or condition.

In another aspect, a fifth method is provided comprising treating an infection with *Mycobacterium bovis* bacillus in a heart of a subject by applying alternating electric fields to the heart of the subject at a frequency between 100 and 500 kHz and administering a therapeutically effective amount of a drug for treating an infection with *Mycobacterium bovis* bacillus to the subject.

In some instances of the fifth method, the antibiotic is selected from the group consisting of one or more of isoniazid, rifampicin, ethambutol, moxifloxacin, pyrazinamide, and streptomycin.

In some instances, the fifth method further comprises administering a therapeutically effective amount of a steroid to the subject. The steroid can be selected from the group consisting of one or more of prednisone and dexamethasone.

In some instances of the fifth method, the alternating electric fields are applied for at least 24 hours or at least 48 hours. In some instances of the fifth method, the frequency is between 125 to 175 kHz. In some instances of the fifth method, the alternating electric fields are applied until the heart of the subject is not infected with *Mycobacterium bovis* bacillus. Alternating electric fields can be applied prior to, during, or after standard of care or other treatment for the disease or condition.

In a further aspect, a sixth method is provided comprising treating endocarditis caused by an infection with *Mycobacterium bovis* bacillus in an inner lining of a heart of a subject by applying alternating electric fields to the heart of the subject at a frequency between 100 and 500 kHz and administering a therapeutically effective amount of a drug for treating an infection with *Mycobacterium bovis* bacillus to the subject.

In some instances of the sixth method, the antibiotic is selected from the group consisting of one or more of isoniazid, rifampicin, ethambutol, moxifloxacin, pyrazinamide, and streptomycin.

In some instances, the sixth method further comprises administering a therapeutically effective amount of a steroid to the subject. The steroid can be selected from the group consisting of one or more of prednisone and dexamethasone.

In some instances of the sixth method, the alternating electric fields are applied for at least 24 hours or at least 48 hours. In some instances of the sixth method, the frequency is between 125 to 175 kHz. In some instances of the sixth method, the alternating electric fields are applied until inner lining of the heart is not infected with *Mycobacterium bovis* bacillus. Alternating electric fields can be applied prior to, during, or after standard of care or other treatment for the disease or condition.

In yet another aspect, a method is provided comprising treating lupus nephritis in a kidney of a subject by applying alternating electric fields to the kidney of the subject at a frequency between 50 and 1000 kHz (e.g., 100 and 500 kHz) and administering a therapeutically effective amount of a drug for treating lupus nephritis to the subject.

In some instances of the method of treating lupus nephritis in a kidney of a subject, the alternating electric fields are applied for at least 24 hours or at least 48 hours. In some instances, the frequency is between 125 to 175 kHz. In some instances, the alternating electric fields are applied until the subject is no longer diagnosed with lupus nephritis. Alternating electric fields can be applied prior to, during, or after standard of care or other treatment for the disease or condition.

In some instances of the method of treating lupus nephritis in a kidney of a subject, the drug for treating lupus nephritis is selected from the group consisting of one or more of azathioprine, cyclophosphamide, prednisone, prednisolone, voclosporin, tacrolimus, mycophenolate, and rituximab.

In some instances, the method of treating lupus nephritis in a kidney of a subject further comprises administering a therapeutically effective amount of an angiotensin-converting enzyme (ACE) inhibitor or an angiotensin II receptor blocker (ARB) to the subject.

The ACE inhibitor can be selected from the group consisting of one or more benaxepril, catopril, enalapril, fosinopril, lisinopril, moexipril, perindopril, quinapril, ramipril, and trandoapril and the ARB is selected from the group consisting of one or more of azilsartan, candesarten, eprosartan, irbesartan, losartan, olmesartan, telmisartan, and valsartan In the exemplary experiments described herein, bone marrow cells were flushed from the femurs and tibias of 5-8 week old Balb\C mice to generate bone marrow—derived macrophages (BMDMs) and were differentiated for 7 days in GM-CSF. To study individual macrophage responses to TTFields, macrophages were stimulated for 24 h with LPS+ IFN-γ (M1 polarization) or IL-4 (M2 polarization), followed by treatment with TTFields (150 kHz) for 24 hours and were profiled. M1 polarization and M2 polarization can lead to cell death after 48 hours of exposure to TTFields. Therefore, as described below, experiments using M1-polarized macrophages and M2-polarized macrophages were assessed at 24 rather than 48 hours.

Flow cytometry was used to assess surface expression of F4/80 (a macrophage biomarker) and the activation markers that included major histocompatibility complex class II (MHC II), CD80, and inducible nitric oxide synthase (iNOS).

TTFields were applied using the Inovitro™ system. In these examples, cells were treated for 24 or 48 hours (h) with TTFields at intensity of 1.75 V/cm (RMS) at a frequency of 150 kHz.

Flow cytometry (MACSQuant Analyzer 10; Miltenyi Biotec, Bergisch Gladbach, Germany) was used to assess surface expression of F4/80 (a pan macrophage biomarker) and the activation markers that included Major Histocompatibility Complex class II (MHC II), CD80, and inducible Nitric Oxide Synthase (iNOS). Viobility 405/452 Fixable Dye (Viobility Dye) was used for the discrimination of dead cells. Cytotoxicity was analyzed based on percent of F4/80 positive cells from single cell count.

A multiplexed secretion assay was used to measure the heterogeneity of the stimulated macrophages (LEGENDplex™ Mouse Macrophage/Microglia Panel (13-plex) Cat #740846, Biolegend). The fold increase or decrease in the secretion of 13 different cytokines (CXCL1 (KC), IL-18, IL-23, IL-12p70, IL6, TNF-α, IL-12p40, free active TGF-β1, CCL22 (MDC), IL-10, IL-6, G-CSF, CCL17 (TARC) and IL-1β) after exposure to TTFields was measured. Cytokine secretion levels were normalized to control.

Data is expressed as mean±SEM. The statistical significance of differences was assessed using GraphPad Prism 9 software (GraphPad Software, La Jolla, CA). Differences between groups were considered significant at values of $0.05 > *p > 0.01$, $p < 0.01$, and $*p < 0.001$.

Examples 1 and 2 below provide test data showing application of TTFields to BMDMs elevated the pro-inflammatory phenotype of M1 polarized BMDMs and induced phenotype skewing of M2 polarized BMDMs to the M1 phenotype. These results elucidate a novel immunoregulatory role of TTFields on macrophage polarization.

EXAMPLE 1

FIGS. 1A-1D show that M0 macrophages are polarized by TTFields to a pro-inflammatory M1 phenotype.

FIG. 1A show there is minimal cytotoxicity to the M0 macrophages caused by applying TTFields for 24 and 48 hours.

Figure 1B:
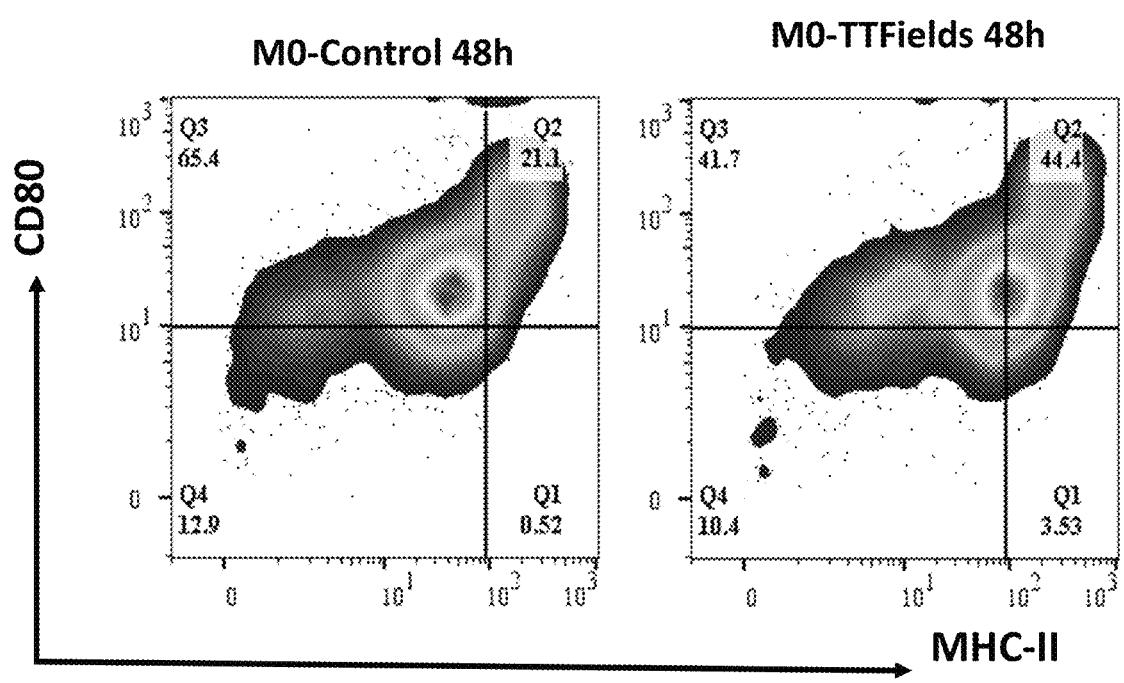
FIG. 1B provides an exemplary flow cytometry analysis of M0 macrophages polarized to the pro-inflammatory M1 macrophage phenotype after no treatment (control) or 48 hours of treatment with TTFields.

FIG. 1B provides exemplary flow cytometry plots showing an increase in the expression of CD80 and MHC-II markers from 21.1 to 44.4 percent after 48 hours exposure to TTFields. These results demonstrate skewing from an M0 macrophage phenotype to an M1 macrophage phenotype.

Figure 1C:
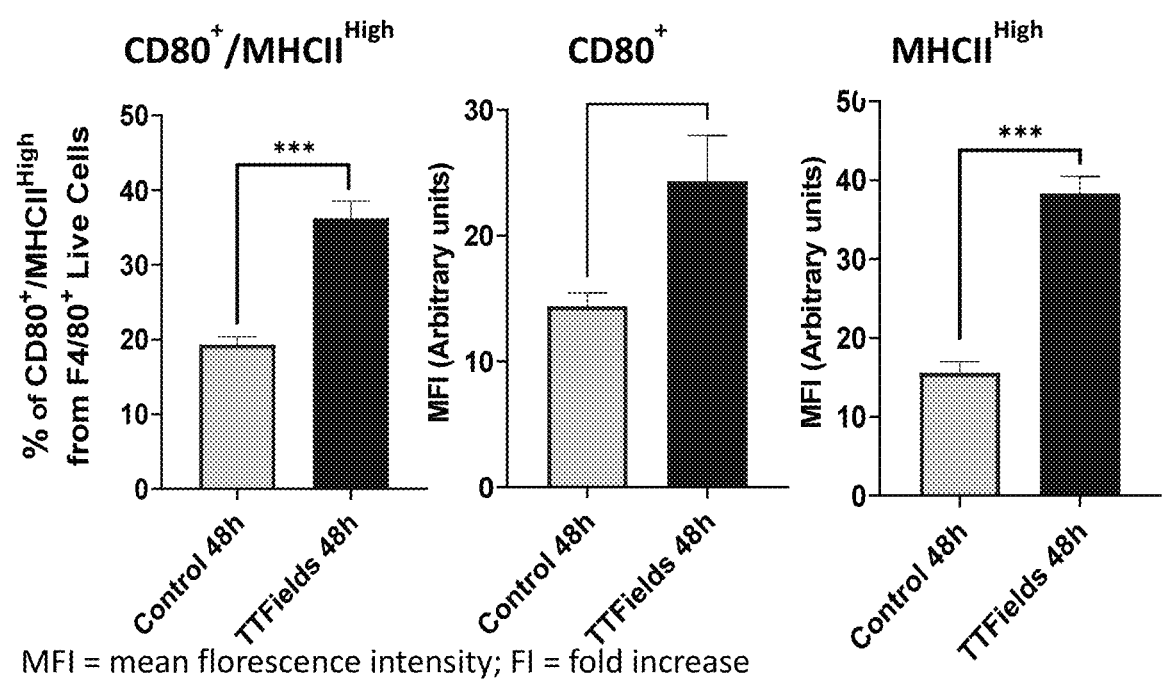
FIG. 1C provides an exemplary bar graph rendering of the data of FIG. 1B showing results for the amount of expression of CD80+/MHCII$^{High}$ on the cell surface for control and alternating electric fields-treated M0 macrophages and by MFI (mean fluorescent intensity) for CD80+ and MHCII$^{High}$ cells.

FIG. 1C provides bar graphs quantifying the flow cytometry results from FIG. 1B, and indicate an increase in expression of pro-inflammatory CD80 and MHC-II markers, along with an increased fluorescence intensity of CD80 and MHC-II markers.

Figure 1D:
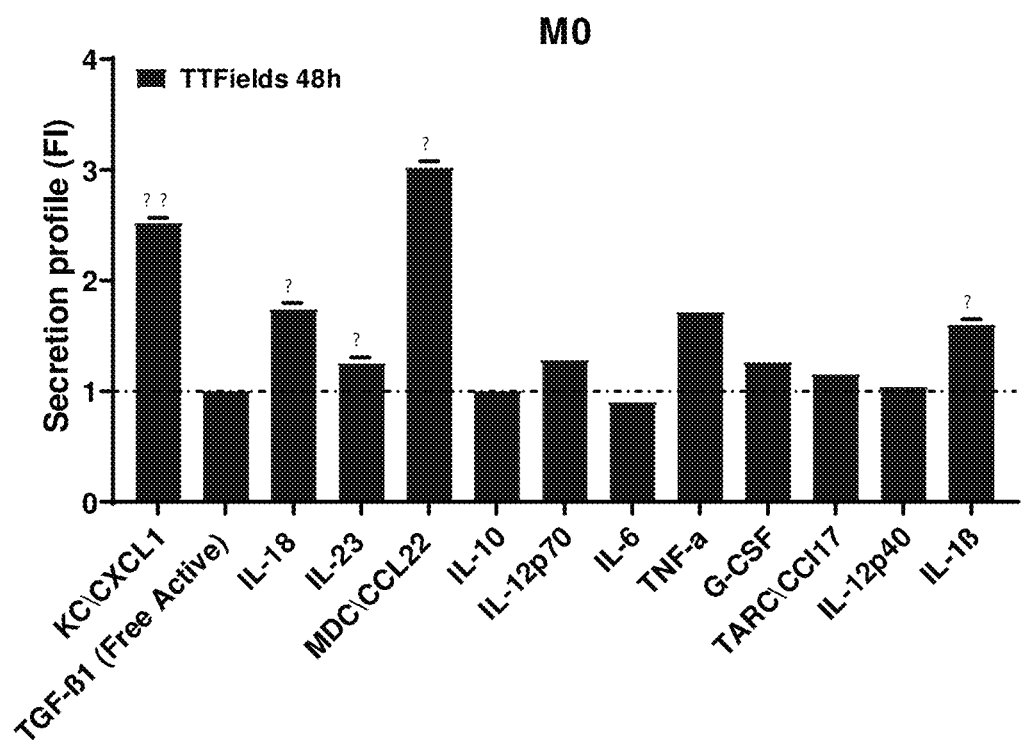
FIG. 1D provides an exemplary cytokine secretion profile for M0 macrophages treated with TTFields for 48 hours as compared to control cells showing the fold increase (secretion profile) of expression over the control untreated M0 macrophages.

FIG. 1D shows the fold increase in the secretion of pro-inflammatory cytokines after application of TTFields for 48 hours. Table 1 below indicates the pro and anti-inflammatory cytokines that were measured. The "Secretion Profile" on the y-axis of FIG. 1D shows the fold increase in cytokine levels compared to control macrophages that were not exposed to TTFields. Increased expression of most of the pro-inflammatory cytokines (e.g., CXCL1, TNFα, IL1β) further indicate a shift of the M0 macrophages to a pro-inflammatory M1 macrophage phenotype.

TABLE 1

| Cytokine | Inflammatory Response |
| --- | --- |
| CXCL1 (KC) | Pro-inflammatory |
| IL-18 | Pro-inflammatory |
| IL-23 | Pro-inflammatory |
| IL-12p70 | Pro-inflammatory |
| IL6 | Pro-inflammatory |
| TNF-α | Pro-inflammatory |
| IL-12p40 | Pro-inflammatory |
| free active TGF-β1 | Anti-inflammatory |
| CCL22 (MDC) | Anti-inflammatory |
| IL-10 | Anti-inflammatory |
| G-CSF | Depends |
| CCL17 (TARC) | Anti-inflammatory |
| IL-1β | Pro-inflammatory |

Taken together, the results of FIGS. 1A-1D demonstrate a significant shift of M0 macrophages to an M1 phenotype induced by application of TTFields.

FIGS. 2A-2D demonstrate that TTFields further promote a pro-inflammatory phenotype of M1 macrophages already polarized to an M1 phenotype by IFN-γ and LPS. As discussed above, stimulation of macrophages with IFN-γ and LPS can result in cell death after 48 hours. Therefore, a 24 hour TTFields exposure was used in the exemplary experiments of FIGS. 2A-2D.

Figure 2A:
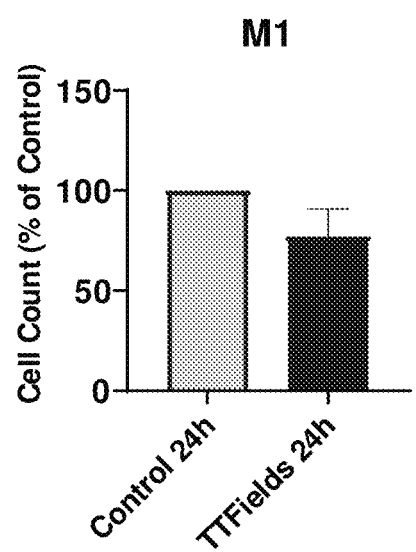
FIG. 2A provides an exemplary analysis of cytotoxicity (cell count as percent of control) of polarized untreated M1 macrophages and TTFields-treated (24 hours) polarized M1 macrophages.

FIG. 2A show the minimal cytotoxicity caused by application of TTFields to M1 polarized macrophages for 24 hours.

Figure 2B:
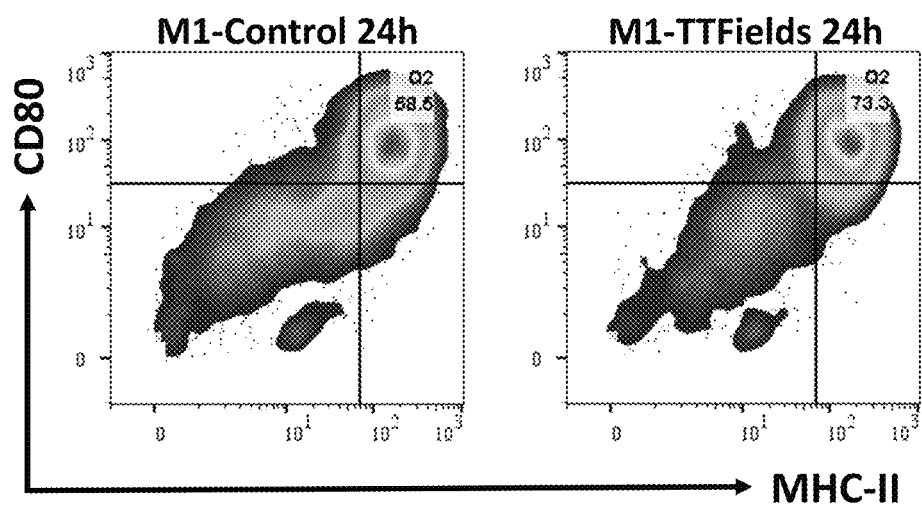
FIG. 2B provides an exemplary flow cytometry analysis of the polarized M1 macrophages after no treatment (control) or 24 hours of treatment with TTFields.

FIG. 2B provides exemplary flow cytometry plots showing an increase in the expression of CD80 and MHC-II markers from 58.5 to 73.3 percent after 24 hours exposure to TTFields in M1 macrophages already stimulated toward an M1 phenotype by IFN-γ and LPS. These results demonstrate a further skewing of M1 polarized macrophages to a more pro-inflammatory M1 macrophage phenotype.

Figure 2C:
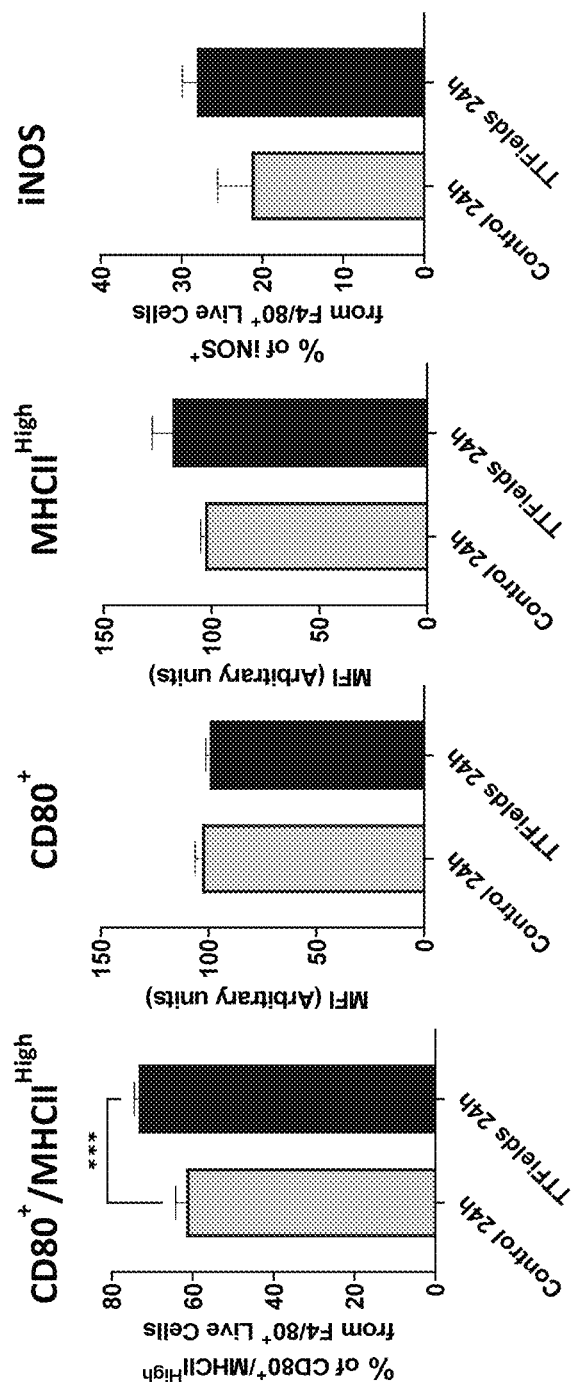
FIG. 2C provides an exemplary bar graph rendering of the data of FIG. 2B showing results for the amount of expression of CD80+/MHCII$^{High}$ on the cell surface for control and alternating electric fields-treated polarized M1 macrophages, by MFI (mean fluorescent intensity) for CD80+ and MHCII$^{High}$ cells, and inducible nitric oxide synthase (iNOS), a pro-inflammatory marker.

FIG. 2C provides bar graphs quantifying the flow cytometry results from FIG. 2B, and indicates an increase in expression of pro-inflammatory CD80 and MHC-II markers, an increased fluorescence intensity of CD80 and MHC-II markers, and an increase percentage of the pro-inflammatory iNOS marker.

Figure 2D:
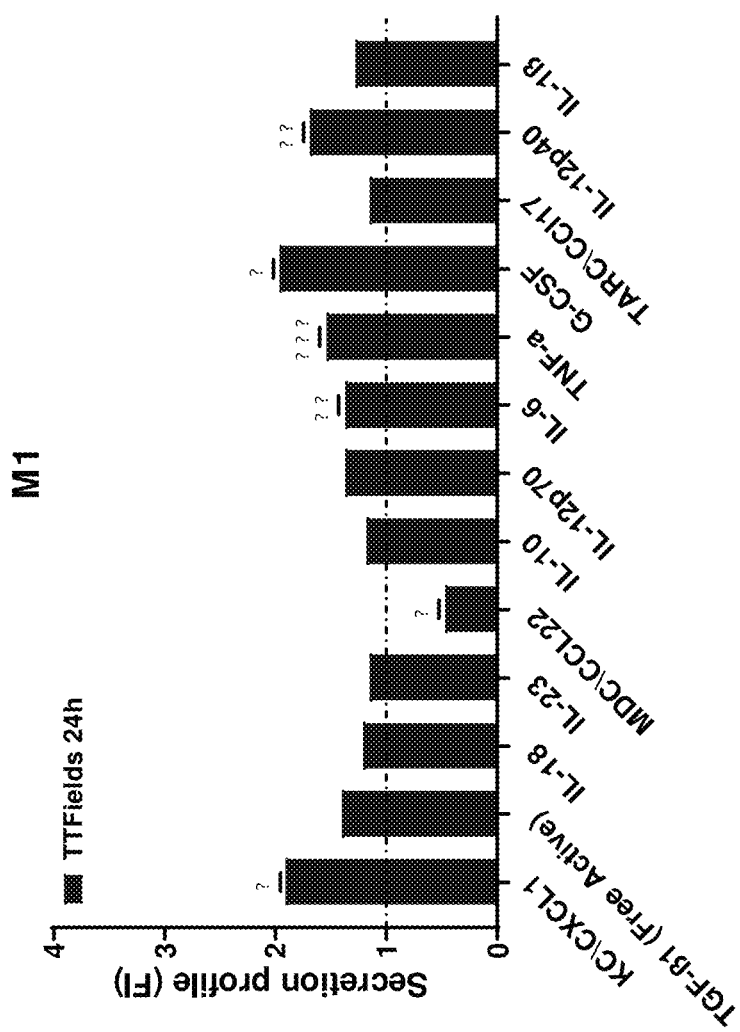
FIG. 2D provides an exemplary cytokine secretion profile for polarized M1 macrophages treated with TTFields for 24 hours as compared to control cells showing the fold increase (secretion profile) of expression over the control untreated polarized M1 macrophages.

FIG. 2D shows the fold increase in secretion of pro-inflammatory cytokines in M1 polarized macrophages after application of TTFields for 24 hours. Increased expression of most of the pro-inflammatory cytokines (e.g., CXCL1, IL-6, TNFα) further indicate a shift the polarized M1 macrophages to a more pro-inflammatory M1 macrophage phenotype.

Taken together, the results of FIGS. 2A-2D demonstrate a significant shift of polarized M1 macrophages to a more pro-inflammatory M1 phenotype induced by application of TTFields.

FIGS. 3A-3D demonstrate that TTFields induce phenotype skewing of IL-4-polarized M2 macrophages to the M1 phenotype as shown by the increased percentage of CD80+ and MHC-II$^{High}$ cells. As discussed above, stimulation of macrophages with IL-4 can result in cell death after 48 hours. Therefore, 24 hour TTFields exposure was used in the exemplary experiments of FIGS. 3A-3D.

Figure 3A:
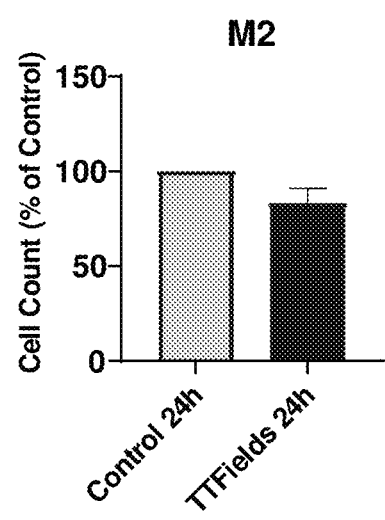
FIG. 3A provides an exemplary analysis of cytotoxicity (cell count as percent of control) control polarized M2 macrophages and TTFields-treated (24 hours) polarized M2 macrophages.

FIG. 3A show the minimal cytotoxicity caused by application of TTFields to IL-4-polarized M2 macrophages for 24 hours.

Figure 3B:
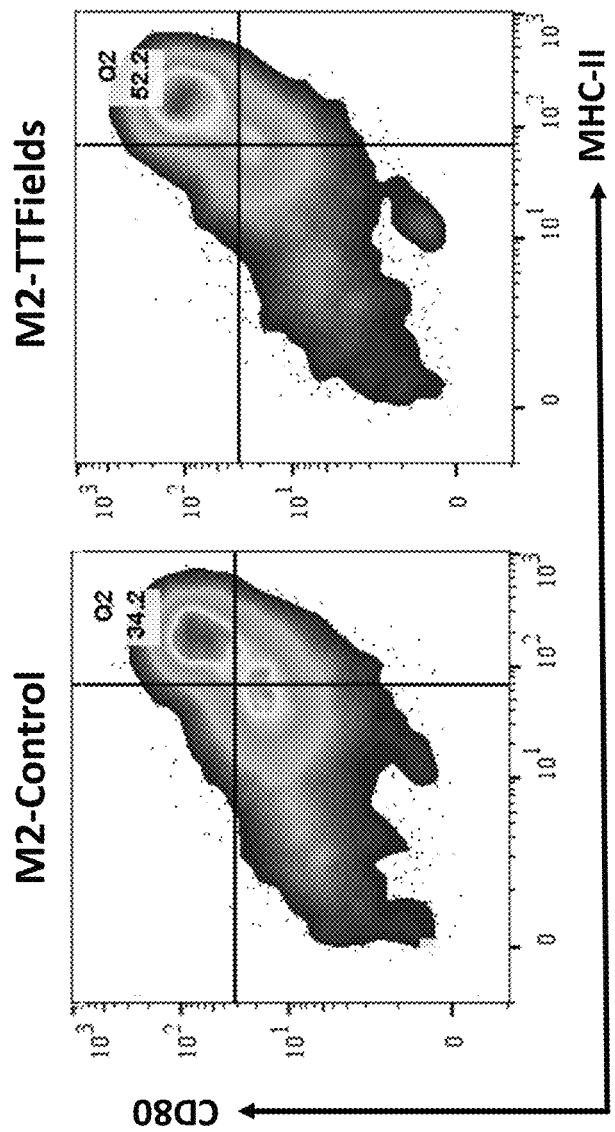
FIG. 3B provides an exemplary flow cytometry analysis of polarized M2 macrophages after no treatment (control) or 48 hours of treatment with TTFields.

FIG. 3B provides exemplary flow cytometry plots showing a further increase in the expression of CD80 and MHC-II markers from 34.2 to 52.2 percent after 24 hours exposure to TTFields in IL-4-polarized M2 macrophages. These results demonstrate skewing of IL-4-polarized M2 macrophages to an M1 macrophage phenotype.

Figure 3C:
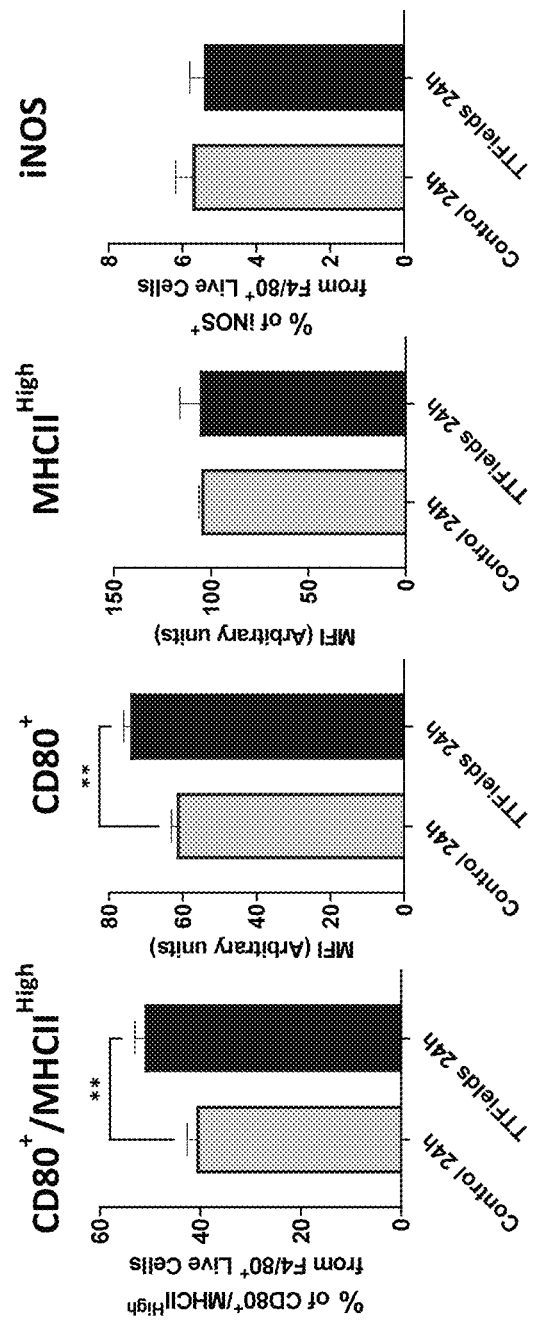
FIG. 3C provides an exemplary bar graph rendering of the data of FIG. 2B showing results for the amount of expression of CD80+/MHCII$^{High}$ on the cell surface for control and alternating electric fields-treated polarized M2 macrophages, by MFI (mean fluorescent intensity) for CD80+ and MHCII$^{High}$ cells, and inducible nitric oxide synthase (iNOS), a proinflammatory marker.

FIG. 3C provides bar graphs quantifying the flow cytometry results from FIG. 3B and indicates an increase in expression of pro-inflammatory CD80 markers and an increase in the fluorescence intensity of CD80 markers. No significant change was observed in MHCII or iNOS expression levels.

Figure 3D:
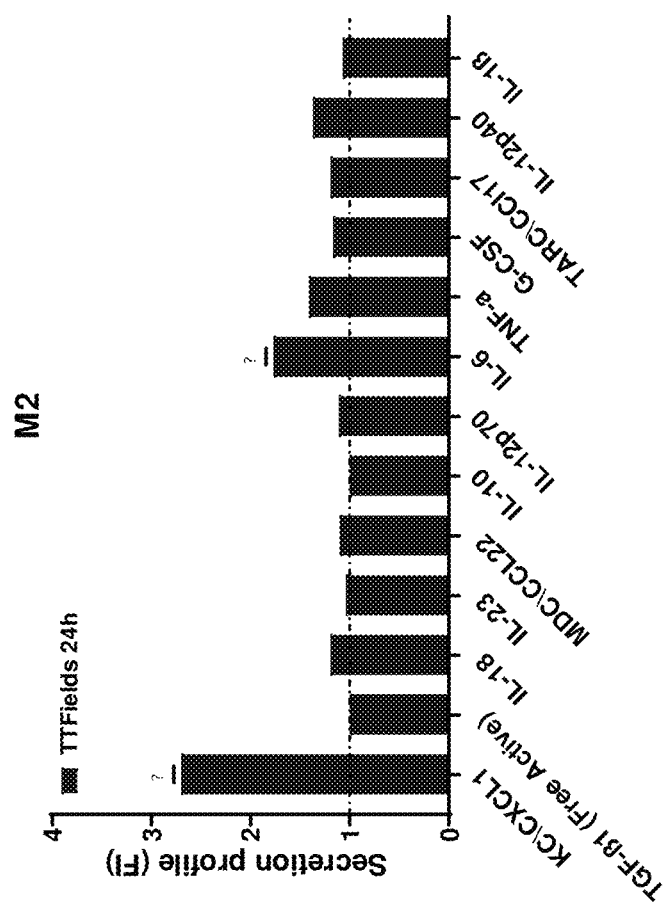
FIG. 3D provides an exemplary cytokine secretion profile for polarized M2 cells treated with TTFields for 48 hours as compared to control cells showing the fold increase (secretion profile) of expression over the control untreated polarized M2 cells.

FIG. 3D shows the fold increase in secretion of pro-inflammatory cytokines after application of TTFields for 24 hours. Increased expression of most of the pro-inflammatory cytokines (e.g., CXCL1, IL-6) further indicate a shift of the polarized M2 macrophages to an M1 macrophage phenotype.

EXAMPLE 2

Figure 4:
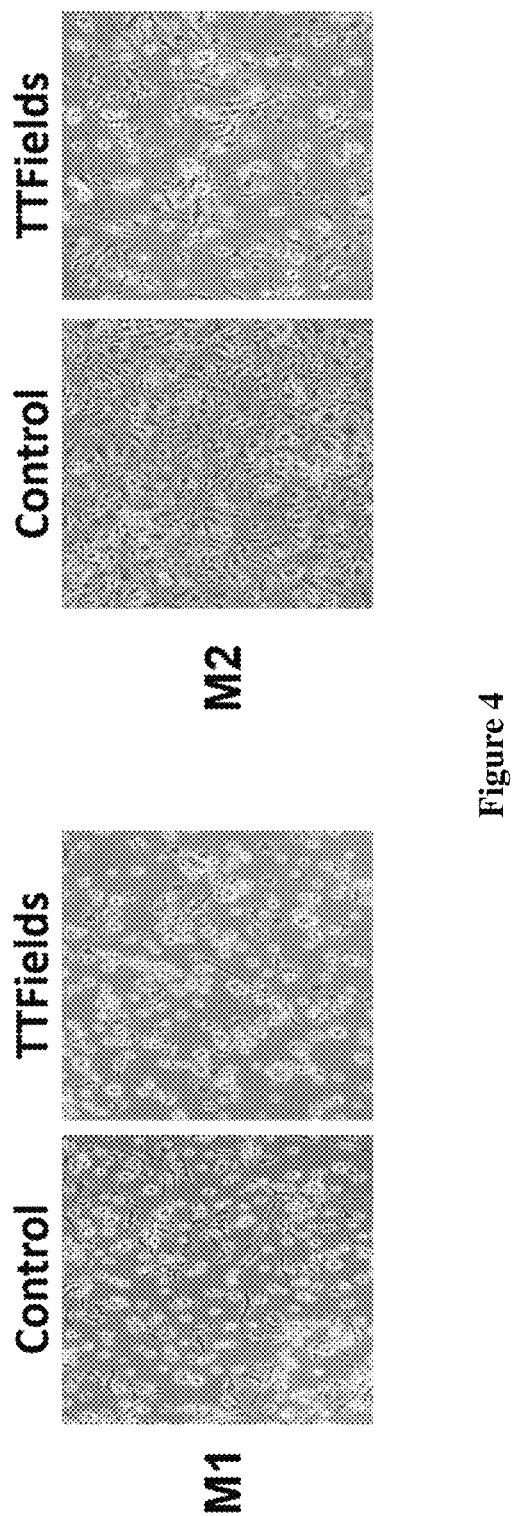
FIG. 4 shows the effect of TTFields on M1 and M2 macrophages.

FIG. 4 shows TTFields induce morphological changes in M2 macrophages, converting them to a dendritic-like M1 phenotype, whereas M1 macrophages are left unchanged.

Figure 5:
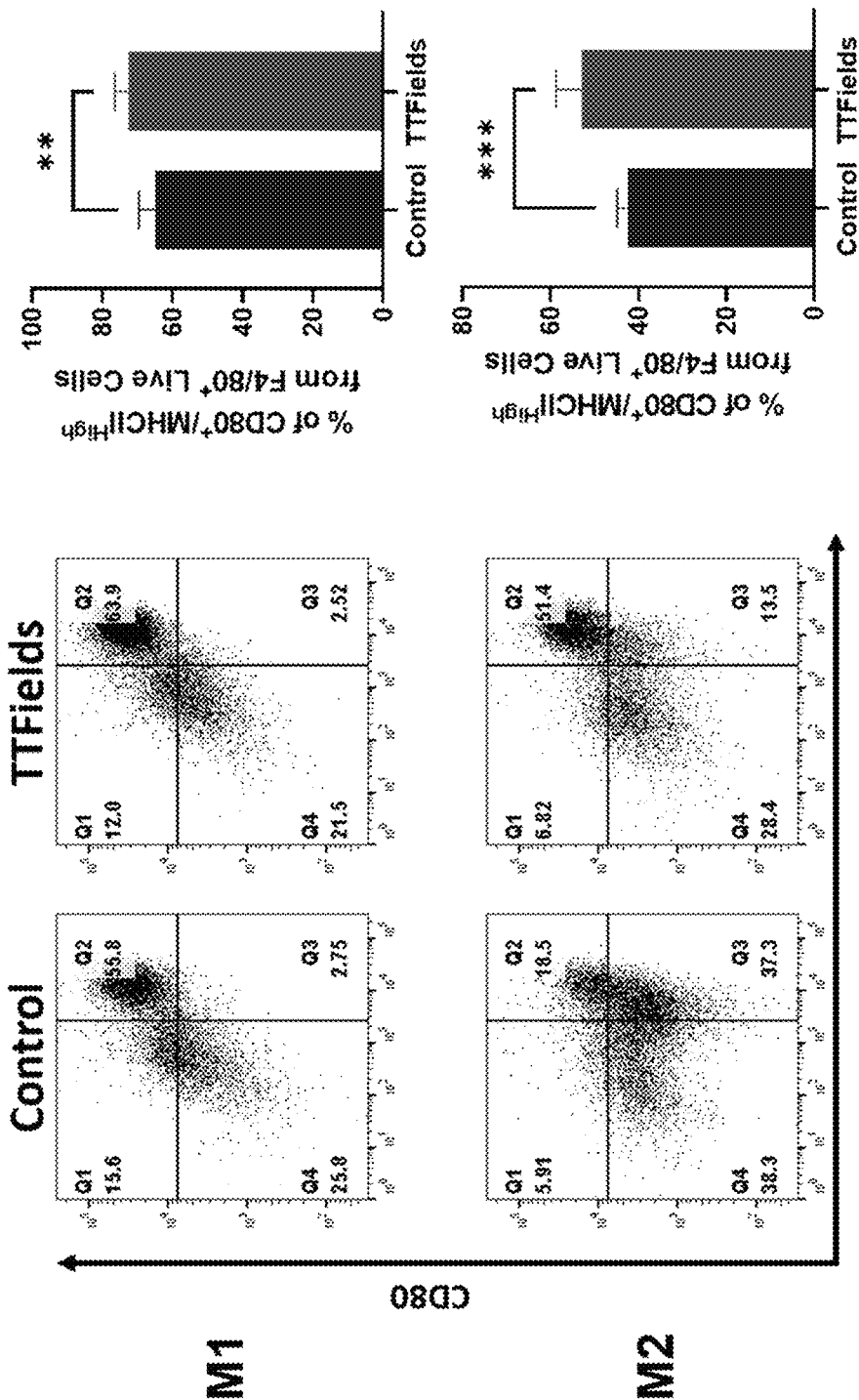
FIG. 5 shows TTFields polarized M2 macrophages to the pro-inflammatory M1 phenotype and elevated the pro-inflammatory nature of M1 macrophages.

FIG. 5 shows TTFields polarized M2 macrophages to the pro-inflammatory M1 phenotype and elevated the pro-inflammatory nature of M1 macrophages, as indicated by elevated expression of CD80 and MHC-II.

Figure 6:
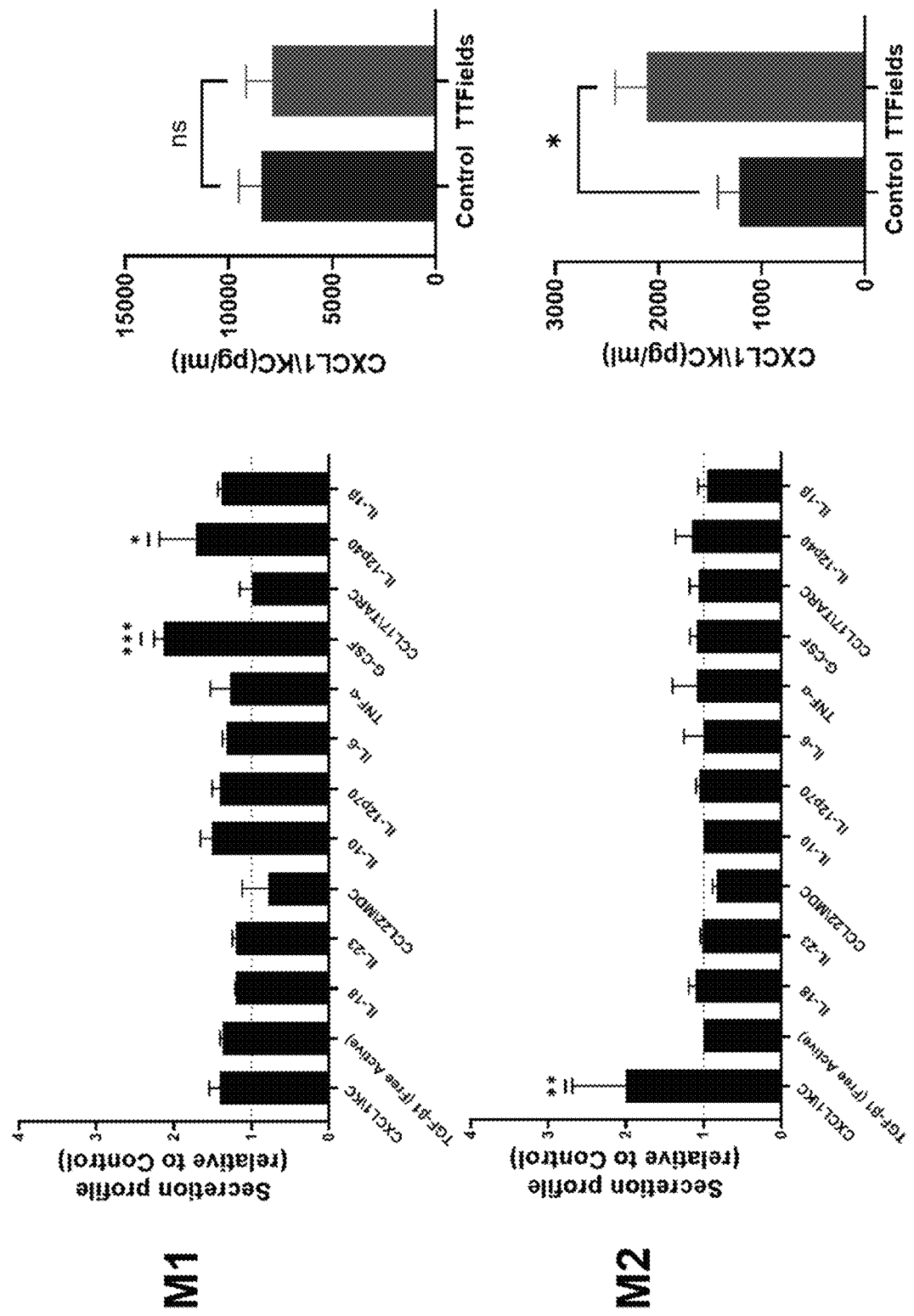
FIG. 6 shows TTFields altered cytokine secretion of macrophages to a pro-inflammatory pattern.

FIG. 6 shows TTFields altered cytokine secretion of macrophages to a pro-inflammatory pattern with significant elevation of CXCL1 in M2.

Figure 7:
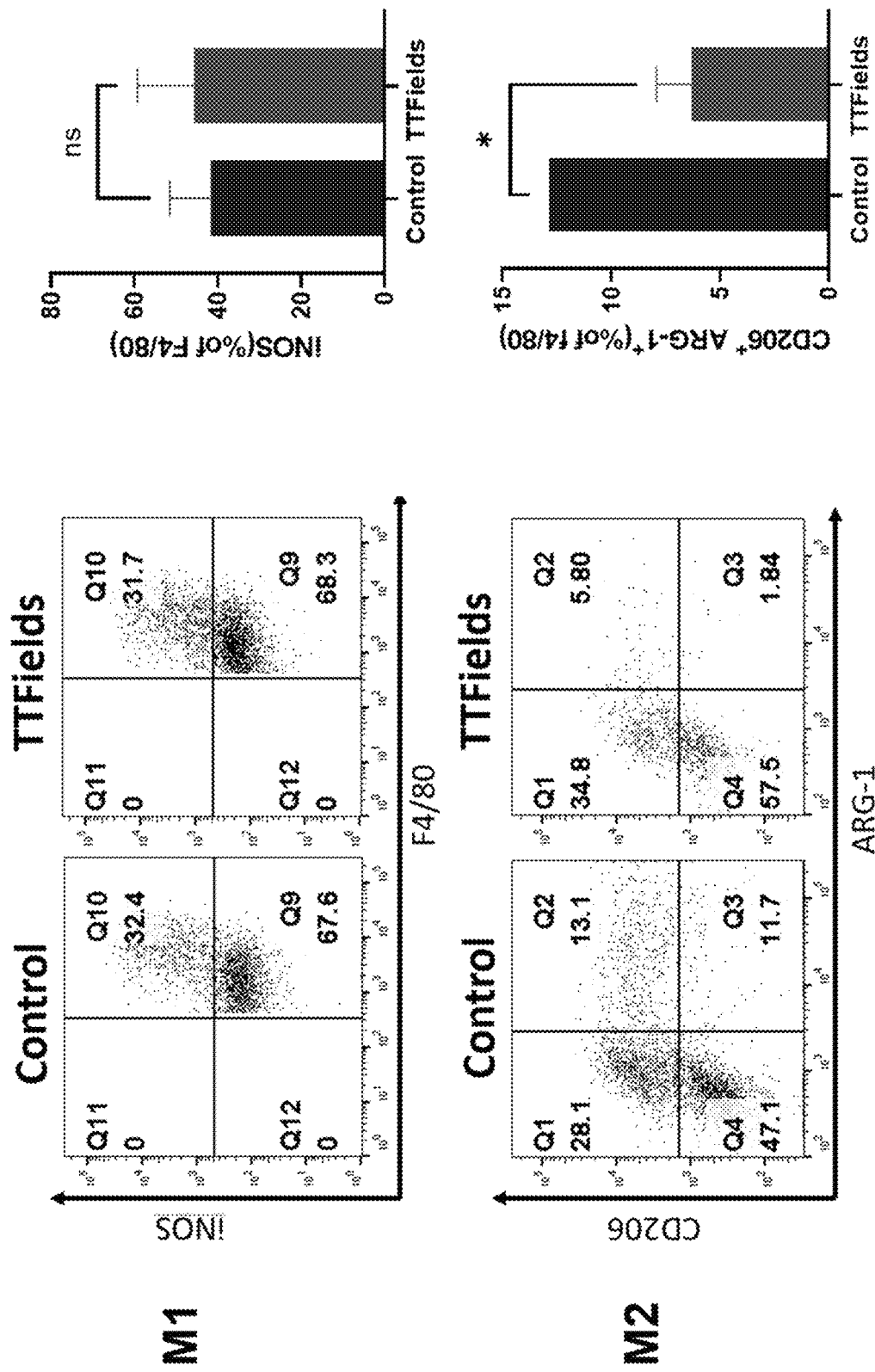
FIG. 7 shows the effect of TTFields on expression of phenotype markers in M1 and M2 macrophages.

FIG. 7 shows TTFields diminished the expression of the M2 phenotype markers CD206 and ARG-1 in both M1 and M2 macrophages but did not affect expression of iNOS, an M1 phenotype marker.

In some aspects, application of the electrical field could be interrupted by breaks. For example, 6 sessions with a duration of 12 hours each, with a 2 hour break between sessions. In another aspect, the step of applying an electrical field has a duration of at least 3 hours. In some instances, alternating electric fields can be applied for 24 or 48 hours at 150 kHz at an intensity of 175 V/m (RMS).

In yet another aspect, the frequency of the alternating electric field is between 50 and 1 MHz, 100 and 500 kHz, 125 to 175 kHz, or 150 kHz. In another aspect, the drug is delivered to the tissue, location, or cells at a therapeutically effective concentration, and the alternating electric field has a field strength of at least 1 V/cm in at least some of the tissue, location, or cells.

In yet another aspect, the alternating electric field has a field strength of 0.1 to 10 V/cm, 1.30 to 4.0 V/cm, 1.50 to 2.0 V/cm, 1.70 to 1.80 V/cm (RMS). In a particular aspect the alternating electric field has a field strength of 1.75 V/cm (RMS).

In yet another aspect, at least a portion of the applying step is performed simultaneously with at least a portion of the administering step.

The in vitro experiments described herein were carried out using the Novocure Inovitro™ system. In these experiments, the direction of the alternating electric fields was switched at one second intervals between two perpendicular directions. But in alternative embodiments, the direction of the alternating electric fields can be switched at a faster rate (e.g., at intervals between 1 and 1000 ms) or at a slower rate (e.g., at intervals between 1 and 100 seconds).

In the in vitro experiments described herein, the direction of the alternating electric fields was switched between two perpendicular directions by applying an AC voltage to two pairs of electrodes that are disposed 90° apart from each other in 2D space in an alternating sequence. But in alternative embodiments, the direction of the alternating electric fields may be switched between two directions that are not perpendicular by repositioning the pairs of electrodes, or between three or more directions (assuming that additional pairs of electrodes are provided). For example, the direction of the alternating electric fields may be switched between three directions, each of which is determined by the placement of its own pair of electrodes. Optionally, these three pairs of electrodes may be positioned so that the resulting fields are disposed 90° apart from each other in 3D space. In other alternative embodiments, the electrodes need not be arranged in pairs. See, for example, the electrode positioning described in U.S. Pat. No. 7,565,205, which is incorporated herein by reference. In other alternative embodiments, the direction of the field remains constant.

In the in vitro experiments using the Inovitro™ system described herein, the electrical field was capacitively coupled into the culture because the Inovitro™ system uses conductive electrodes disposed on the outer surface of the dish sidewalls, and the ceramic material of the sidewalls acts as a dielectric. But in alternative embodiments, the electric field could be applied directly to the cells without capacitive coupling (e.g., by modifying the Inovitro™ system configuration so that the conductive electrodes are disposed on the sidewall's inner surface instead of on the sidewall's outer surface).

The methods described herein can also be applied in the in vivo context by applying the alternating electric fields to a target region of a live subject's body (e.g., using the Novocure Optune® system). This may be accomplished, for example, by positioning electrodes on or below the subject's skin so that application of an AC voltage between selected subsets of those electrodes will impose the alternating electric fields in the target region of the subject's body.

For example, in situations where the relevant cells are located in the subject's brain, one pair of electrodes could be positioned on the front and back of the subject's head, and a second pair of electrodes could be positioned on the right and left sides of the subject's head. In some embodiments, the electrodes are capacitively coupled to the subject's body (e.g., by using electrodes that include a conductive plate and also have a dielectric layer disposed between the conductive plate and the subject's body). But in alternative embodiments, the dielectric layer may be omitted, in which case the conductive plates would make direct contact with the subject's body. In another embodiment, electrodes could be inserted subcutaneously below a patient's skin. An AC voltage generator applies an AC voltage at a selected frequency (e.g., 200 kHz) between the right and left electrodes for a first period of time (e.g., 1 second), which induces alternating electric fields where the most significant components of the field lines are parallel to the transverse axis of the subject's body.

Then, the AC voltage generator applies an AC voltage at the same frequency (or a different frequency) between the front and back electrodes for a second period of time (e.g., 1 second), which induces alternating electric fields where the most significant components of the field lines are parallel to the sagittal axis of the subject's body. This two step sequence is then repeated for the duration of the treatment. Optionally, thermal sensors may be included at the electrodes, and the AC voltage generator can be configured to decrease the amplitude of the AC voltages that are applied to the electrodes if the sensed temperature at the electrodes gets too high. In some embodiments, one or more additional pairs of electrodes may be added and included in the sequence. In alternative embodiments, only a single pair of electrodes is used, in which case the direction of the field lines is not switched. Note that any of the parameters for this in vivo embodiment (e.g., frequency, field strength, duration, direction-switching rate, and the placement of the electrodes) may be varied as described above in connection with the in vitro embodiments. But care must be taken in the in vivo context to ensure that the electric field remains safe for the subject at all times.

Note that in the experiments described herein, the alternating electric fields were applied for an uninterrupted interval of time (e.g., 24, 48 hours). But in alternative embodiments, the application of alternating electric fields may be interrupted by breaks that are preferably short. For example, a 24 hour interval of time could be satisfied by applying the alternating electric fields for six 4 hour blocks, with 1 or 2 hour breaks between each of those blocks.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the claims listed below, and equivalents thereof.

REFERENCES

1. Giladi M et al. *Sci Rep.* 2015;5:18046
2. Wong et al., Tumor treating fields exert cellular and immunologic effects, Cancer Research, AACR Annual Meeting 2018; Apr. 14-18, 2018; Chicago, IL, Abstract 1707.

What is claimed is:

1. A method of treating an infection in a subject, comprising:
    applying alternating electric fields of frequency between 50 and 500 kHz and field strength of 0.1 to 10 V/cm to the subject; and
    administering a therapeutically effective amount of an antibiotic for treating the infection to the subject; wherein the infection is with:
    *Tropheryma whipplei*, or *Salmonella* in a digestive system and the alternating electric fields are applied to the digestive system of the subject.

2. The method of claim 1, wherein the infection is with *Tropheryma whipplei*, or *Salmonella* in a digestive system of the subject, and wherein the antibiotic is selected from the group consisting of one or more of penicillin, streptomycin, tetracycline, ceftriaxone, meropenem, co-trimoxazole, doxycycline, hydroxychloroquine, fluoroquinolones, and azithromycin.

3. The method of claim 2, wherein the frequency is between 125 and 175 kHz.

4. The method of claim 2, wherein the alternating electric fields are applied for at least 24 hours.

5. The method of claim 2, wherein the alternating electric fields are applied until the digestive system of the subject is not infected with *Tropheryma whipplei*, or *Salmonella*.

* * * * *